Oct. 17, 1961  H. HUMMEL  3,005,097
METHOD AND APPARATUS FOR THE ANALYSIS BY
RADIATION OF MIXTURES OF SUBSTANCES
Filed Aug. 16, 1957  8 Sheets-Sheet 1

United States Patent Office 3,005,097
Patented Oct. 17, 1961

3,005,097
METHOD AND APPARATUS FOR THE ANALYSIS BY RADIATION OF MIXTURES OF SUBSTANCES
Heinz Hummel, Frankfurt am Main-Unterliederbach, Germany, assignor to Hartmann & Braun Aktiengesellschaft, Frankfurt am Main, Germany, a corporation of Germany
Filed Aug. 16, 1957, Ser. No. 678,617
Claims priority, application Germany Aug. 18, 1956
12 Claims. (Cl. 250—43.5)

The present invention relates to a method of analyzing mixtures of substances. In this method, the absorption of radiation by the components to be analyzed is employed for the measurement. In these analyzers, two basically different methods are possible, namely the positive and the negative filter method. In the first there is generally employed alternating light using selective pneumatic receivers. The second method operates both with steady and with alternating light and employs non-selective receivers, for instance bolometers or thermopiles. The selectivity is obtained in this connection by the use of a sensitizing cell filled with the substance to be determined.

The object of the invention is to create a method and apparatus for the carrying out of this method which make it possible to effect the analysis, with a high degree of accuracy, of mixtures of substances, primarily of mixtures of gases or vapors.

Another object of the invention is to provide instruments for gas analysis with the use of infrared radiation which have a high zero-point certainty and great sensitivity.

The method in accordance with the invention furthermore has the advantage that it requires no moving parts such as shutter disks, etc., in the path of the ray. Furthermore, the instruments in accordance with the invention have considerably greater selectivity and a considerably greater stability of the zero point.

In one embodiment of the method of the invention pressure or density variations are produced periodically in the gas mixture to be analyzed which is contained in a measurement cell. The measurement cell is placed in the ray path between a source of radiation and a radiation receiver so that the radiation is modulated by the variation in density in the gas to be measured.

In another embodiment of the apparatus in accordance with the invention, two sources of radiation and two radiation receivers are employed. A modulation cell filled with the gas, the percentage of which in the analysis gas is to be determined, is placed in each of the ray paths. Pressure variations of the same phase are produced in two modulation cells which are advisedly connected with each other, so that the rays passing through them are modulated in phase in the range of modulation of the components to be measured. In one ray path there is contained a cell which is filled with the measurement gas, while in the second ray path, there is contained a cell which is filled with comparison gas. Furthermore, special filter cells can also be provided in each ray path. A variant of this arrangement contains only a single receiver for the two ray paths. In the two modulation cells, there are produced variations which are 180° out of phase, rather than in phase.

The alternating pressure can be produced in various manners. Thus a periodically moved piston or a periodically controlled flow of gas, such as a gas changeover switch, can be employed for this purpose. There can also be used a diaphragm which is driven for instance by a synchronous motor and which transmits the oscillations to the mixture which is to be analyzed or to the modulation cell.

As receiver, there can be employed for instance bolometers, thermocouple receivers, pneumatic receivers, photoelectric cells, photo tubes or the like.

Apparatus of various types can be used for carrying out the method in accordance with the invention.

There can be used advantageously for instance an apparatus developed as a single-beam instrument. This single beam instrument has in accordance with the invention a measuring cell containing the mixture to be analyzed, a source of radiation, a receiver for the modulated radiation, possibly one or more modulation cells and a member for producing oscillations which produce an alternating pressure in the mixture to be analyzed or in the modulation cells or one of them.

The apparatus for carrying out the method in accordance with the invention can however also be developed as a double-beam apparatus, i.e., an instrument having two ray paths which either proceed from two separate radiators or from only a single radiator, in which connection however, the beam of rays proceeding from it is split into two ray paths. In each ray path, at least one cell produces an alternating pressure. Furthermore, a modulation cell is provided in each ray path. In one of the ray paths, a comparison cell is provided while in the other ray path a measurement cell for the mixture to be analyzed is provided. Furthermore, two receivers for the radiation are employed in connection with this apparatus. The two modulation cells are connected with each other and, via a transverse connection, with a modulation capsule in which oscillations are produced which then effect the alternating pressure in the modulation arrangement. One can also get along with only one receiver if the ray paths are modulated in push-pull and the beams combined on one receiver.

In the two possible embodiments described above for the apparatus, a plurality of modulation cells can also be installed in each ray path. Furthermore, in many cases it has proven advisable to provide in each ray path a filter cell to receive an interfering gas mixture. These filter cells can contain a single component or multi-component interfering gas mixture.

In order to produce the alternating pressure in the devices described, there can be provided a periodically moved piston which slides advisedly in a cylinder. There can also advantageously be employed a cylinder which is closed by a diaphragm, the cylinder not being contacted upon the periodic movement of the piston.

Another possibility of producing the alternating pressure consists in employing a periodically controlled stream of gas. One suitable design is a periodically actuated gas reversing switch. In another design which is also suitable, the stream of gas emerging from a nozzle is attenuated by the periodic insertion of a resistance.

The devices in accordance with the invention are characterized by substantial simplifications in construction as compared with the known devices. Thus for instance all moving parts in the ray path are avoided. Furthermore, it is made possible to construct a single beam apparatus having a zero-point constancy which is far superior to the constancy of double beam instruments. In particular the drifting of the zero point with the variation in temperature is practically excluded. Furthermore, in many cases the selective measurement of concentrations of substances with non-selective receivers is possible. With a receiver which is already selected there is obtained an increased selectivity and in particular increased selectivity is obtained when one modulation cell is preferred in an apparatus in accordance with the invention having two ray paths.

In one advantageous development of the invention, it has been found favorable to modulate the radiation with approximately sinusoidal amplitude. This measure, in case of apparatus for the analysis of mixtures of substances by radiation, results in a considerable improvement of the signal-to-noise ratio of the signal arriving at a subsequent measuring device.

In a preferred embodiment of the apparatus in accordance with the invention, a desired phase relationship is established between the alternating pressure in the modulation cell and the alternating pressure in the measurement cell. As a result of this, a setting which is independent in particular of variations of the source of radiation and thus the measurement of any desired given value is made possible for instance with apparatus having only a single ray path (single beam instruments) for the anaylsis of mixtures of substances in the ray path of which two modulators operated in phase with each other, for instance a modulation cell and a measurement cell, act. This is particularly advantageous when such an apparatus is used as a measured-value transmitter with suppressed measurement range for a control system.

As a further embodiment of the invention, there is contemplated an arrangement for adjusting the state of aggregation in the measurement, comparison or modulation cell, by means of which a compensating value is set. The state of aggregation in the measurement, comparison or modulation cell associated in each case with the compensating value serves as a measure of the concentration of the substance which is to be determined. In the case of single beam instruments and multi-beam instruments (apparatus with multiple ray paths) with in each case only a single radiator and a single receiver, the above mentioned compensating value is advisedly zero for the alternating-light component while in the case of multi-beam instruments having a plurality of receivers and radiators, it is so selected for the alternating-light component that a zero value is easily obtained for the alternating-light component by a detecting device.

One essential advantage of the above described compensating device for apparatus for the analysis of mixtures of substances is that changes, caused for instance by variations in the power lines, in the amplification of the detection device or variations of the radiator output, do not have any effect on the accuracy of the measurements.

In the following description, the method of the invention will be described in further detail on basis of the drawings. The drawings show examples of arrangements for the carrying out of the method in accordance with the invention.

Figure 1:
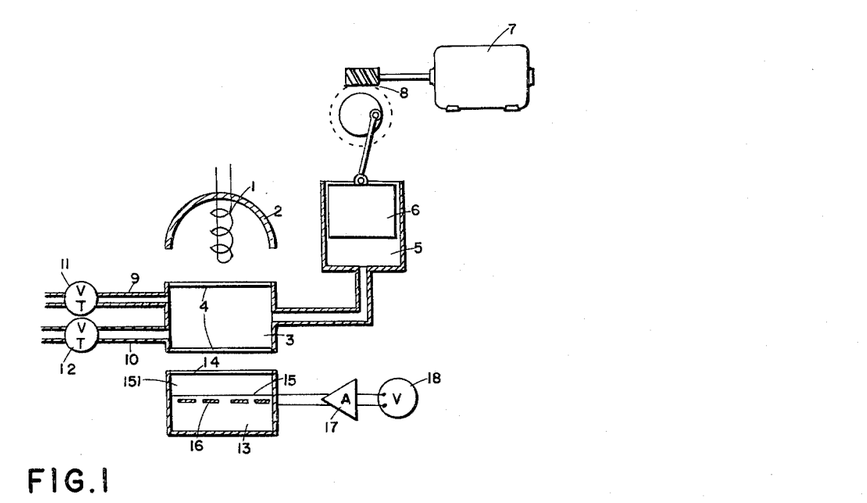
FIG. 1 shows schematically an analysis instrument with a single ray path.

Referring to FIG. 1, 1 is a radiator which emits infrared radiation and 2 is a reflector which focuses this radiation. 3 is a cell, preferably of cylindrical shape, the ends 4 of which are developed as windows of material which is permeable to infrared, for instance rock salt. The gas which is to be analyzed flows from a device for producing and maintaining constant an elevated pressure through conduit 9 via the adjustable throttle valve 11 into the measurement cell 3 and leaves it via conduit 10 and the throttle valve 12. The radiation penetrates through the cell 3 filled with the gas to be measured, and enters the radiation receiver 13. The latter is developed as a pneumatic receiver and consists of a cylindrical vessel, the upper closure plate 14 of which is made of material which is permeable to infrared radiation. In this vessel there is provided a metallic diaphragm 15. Opposite it there is arranged a perforated electrode plate 16 which is insulated from the diaphragm. The diaphragm and the electrode plate together form a condenser of variable capacitance and are connected with an amplifier 17 to the output of which there is connected a voltmeter or ammeter 18. The gas space 151 between the diaphragm 15 and the window 14 is filled with the gas component, the amount of which in the analysis gas is to be measured. If infrared radiation of the wavelength which is absorbed by the component to be measured passes through the window 14, the gas present between the window 14 and diaphragm 15 is heated. It expands and presses the diaphragm 15 closer against the electrode plate 16. This results in a change in the capacitance of the diaphragm capacitor consisting of the elements 15 and 16. A cylinder 5 in which a piston 6 slides up and down in a gas-tight manner is connected with the measurement cell 3 by a conduit. The piston is placed in rapidly oscillating motions of a given frequency by a synchronous motor 7 via a gearing 8. The density of the gas in the measurement cell 3 is thereby subjected to periodic variations. Instead of using a piston pump for generating the pressure variations, there can of course also be employed a rotary pump. If the component of interest with which the receiver 13 is filled is present in the measurement gas, then the absorption of the infrared radiation in the characteristic spectral region of the gas with which the receiver 13 is filled is also subjected to periodic variations which result in a periodic heating of said gas and accordingly also a periodic increase in its pressure. The periodic variations in the capacitance of the diaphragm capacitor 15 and 16 caused hereby are fed to the amplifier 17 and indicated by the instrument 18. The deflection of the instrument 18 is a measure of the content in the measurement gas of the component with which the upper chamber 151 of the receiver 13 is filled.

Figure 2:
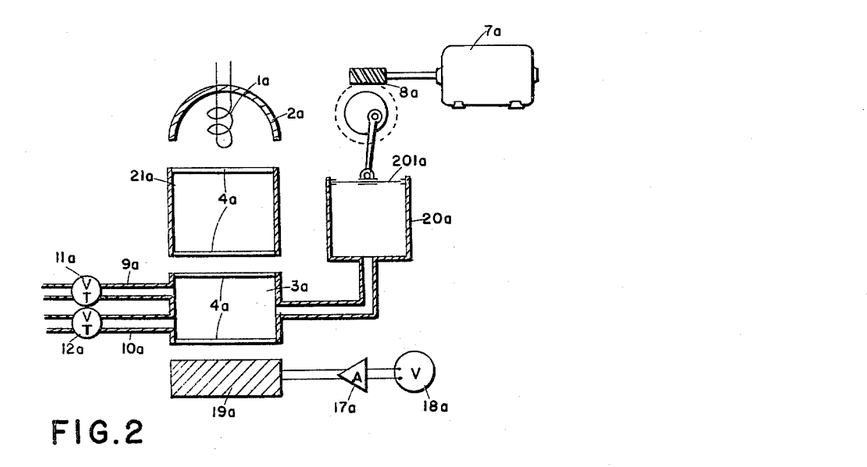
FIG. 2 shows schematically an analysis instrument having another modulation device and another radiation receiver.

FIG. 2 shows a similar apparatus which is to the greater part of similar construction to the apparatus of FIG. 1. Once again there is provided a radiator, the radiation of which is focused by a concave reflector. The radiator is designated 1a and the concave reflector 2a. The radiation is directed onto a receiver 19a. The latter is developed as a non-selective receiver, for instance as a bolometer, photoelectric cell or thermocouple. Its electric output is fed to an amplifier 17a. The amplified output signal is indicated by an indicating device 18a. In the ray path between the radiator 1a and the receiver 19a, there is again contained a measurement cell 3a into which the measurement gas is introduced via the feed line 9a and the throttle valve 11a and from which it flows again via the conduit 10a and the throttle valve 12a. The apparatus for modulating the pressure or density of the measurement gas consists of a housing 20a which is connected with the measurement cell 3a. The housing 20a is closed by a diaphragm 201a which is placed in oscillating motion by a synchronous motor 7a via a gearing 8a. A cell 21a filled with disturbing gases is arranged in front of the measurement cell 3a in the ray path of the radiator 1a. The cell 21a, as well as the measurement cell 3a, is closed off on top and on bottom by windows of material 4a which is permeable to infrared. The manner of operation of this arrangement corresponds in principle—aside from differences in the receiver or the pressure-modulation apparatus—entirely with the arrangement in accordance with FIG. 1.

Figure 3:
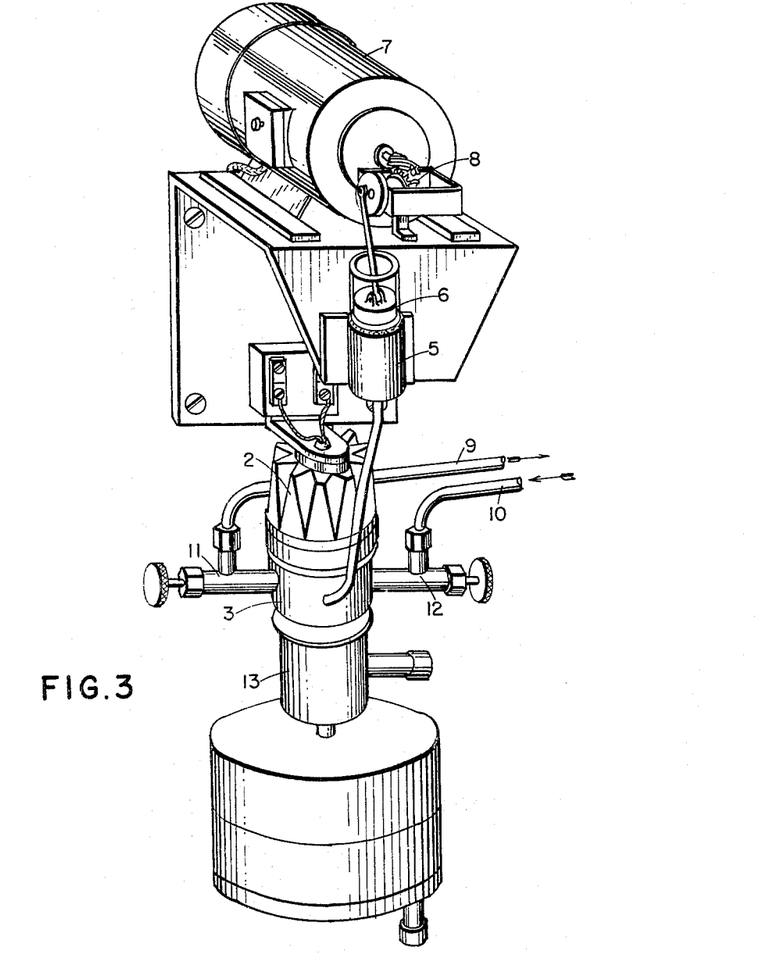
FIG. 3 shows the apparatus in accordance with FIG. 1.

FIG. 3 shows a picture of the apparatus shown schematically in FIG. 1. The designations correspond to the numbers employed in FIG. 1.

Figures 4, 5, 6, 7, 8:
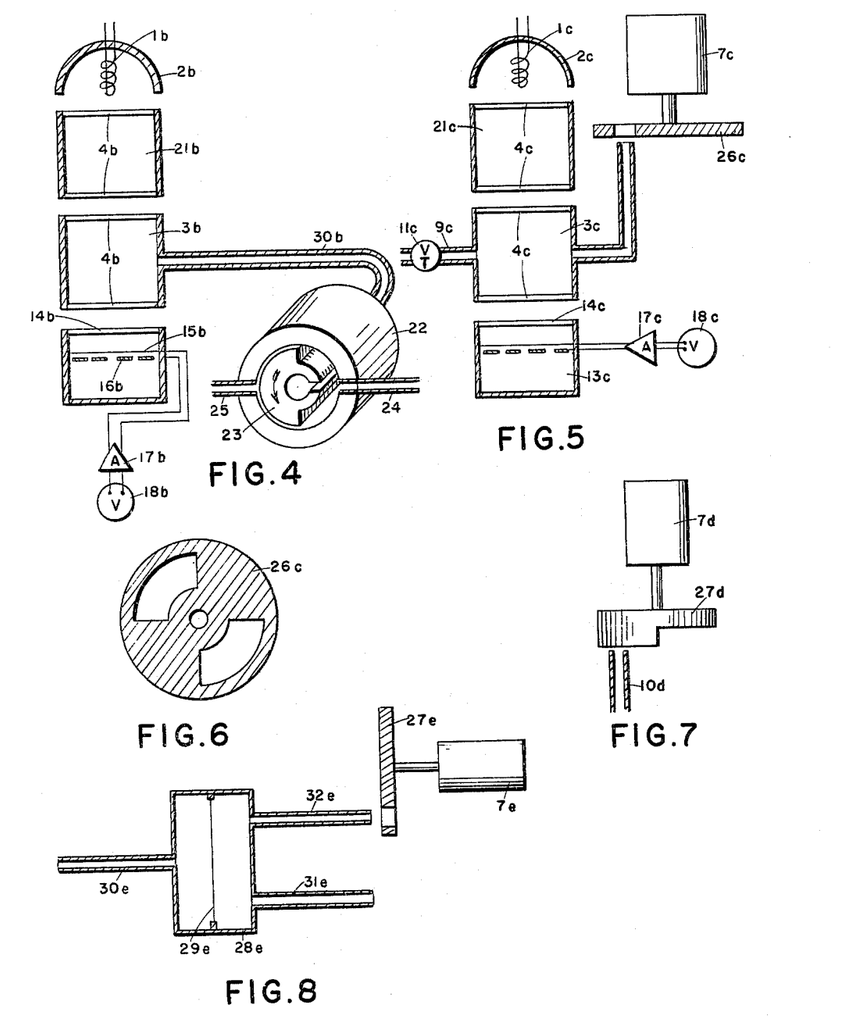
FIGS. 4 and 5 also show apparatus having a single ray path and different modulation devices.
FIGS. 6 and 7 show details of the modulation devices which can be used in connection with the apparatus in FIG. 5.
FIG. 8 is a modulation device which can be used in the apparatus of FIGS. 1 and 2.

FIG. 4 shows an apparatus, the manner of operation of which corresponds to the apparatus of FIG. 1. The parts 1b to 18b correspond in their manner of operation to the parts 1 to 18 of FIG. 1. Only the apparatus for producing the periodically varying pressure in the measurement cell 3b differs from the apparatus in accordance with FIGS. 1, 2 and 3. The measurement cell is connected via a conduit 30b with a rotating gas reversing switch 22. The measurement gas which is maintained at a constant pressure greater than atmospheric by a special device, not shown, passes through conduit 24 into the switch 22. The gas can emerge from the gas switch into the open atmosphere through conduit 25. The rotating slide which is turned by a motor, not shown, alternately connects the gas feed line 24 and the gas discharge line 25 with the measurement cell 3b. The latter is thereby alternately filled with the measurement gas which is under a pressure greater than atmospheric and then connected with the open atmosphere, whereby the pressure of the measurement gas is reduced. In this way pressure variations are produced in the measurement cell 3b by which the radiation of the source of voltage 1b is modulated. A cell which can be filled with a disturbing gas mixture and which corresponds in its manner of operation to the cell 21a of FIG. 2 is also provided in the ray path.

FIG. 5 shows an instrument for the analysis of gas mixtures which in its manner of operation essentially corresponds to the instrument of FIGS. 1 to 4. The parts marked 1c to 18c correspond in their manner of operation to the parts 1 to 18, 1a to 18a and 1b to 18b in FIGS. 1 and 3 respectively. The gas which is to be analyzed comes from a device for producing a constant pressure through conduit 9c via the throttle valve 11c into the measurement chamber 3c and leaves the latter through the gas discharge conduit 10c. In front of the mouth of the conduit 10c, there is arranged a rotating shutter disk 26c, which is driven by the synchronous motor 7c. The shutter disk, the shape of which is shown in FIG. 6, alternately increases and reduces at a given frequency the resistance opposing the emergence of the measurement gas from tube 10c and in this way produces pressure and density variations in the cell 3c.

FIG. 7 shows another form of controlling the resistance to the emergence of the gas from the tube 10c. It can be used in the instrument shown in FIG. 5 instead of the parts 7c and 26c. The manner of operation of this modulating device corresponds to the manner of operation of parts 7c and 26c in FIG. 5.

FIG. 8 shows details of a modulating device, such as can be used in the instrument according to FIG. 2 instead of the parts 7a, 8a, 201a and 20a. The left-hand part of the housing 28e, which is subdivided in the center by the diaphragm 29e, is connected with the measurement chamber 3a via the tube 30e. Through a conduit 31e compressed air enters the right-hand side of the housing 28e. The compressed air discharges, through conduit 32e, into the open. Right in front of the pipe 32e, there is arranged the disk-shaped plate 27e, the form of which is precisely the same as that of plate 26c in FIG. 6. This plate is rotated by the synchronous motor 7e. In this way the end of the pipe 32e is alternately released and practically closed again. The pressure in the right-hand part of the housing 28e is subject to periodic variations. By means of the diaphragm, this pressure is also imparted to the left-hand part of the housing 28e and, via conduit 30e, to the measurement gas contained in the measurement chamber 3 or 3e.

Figure 9:
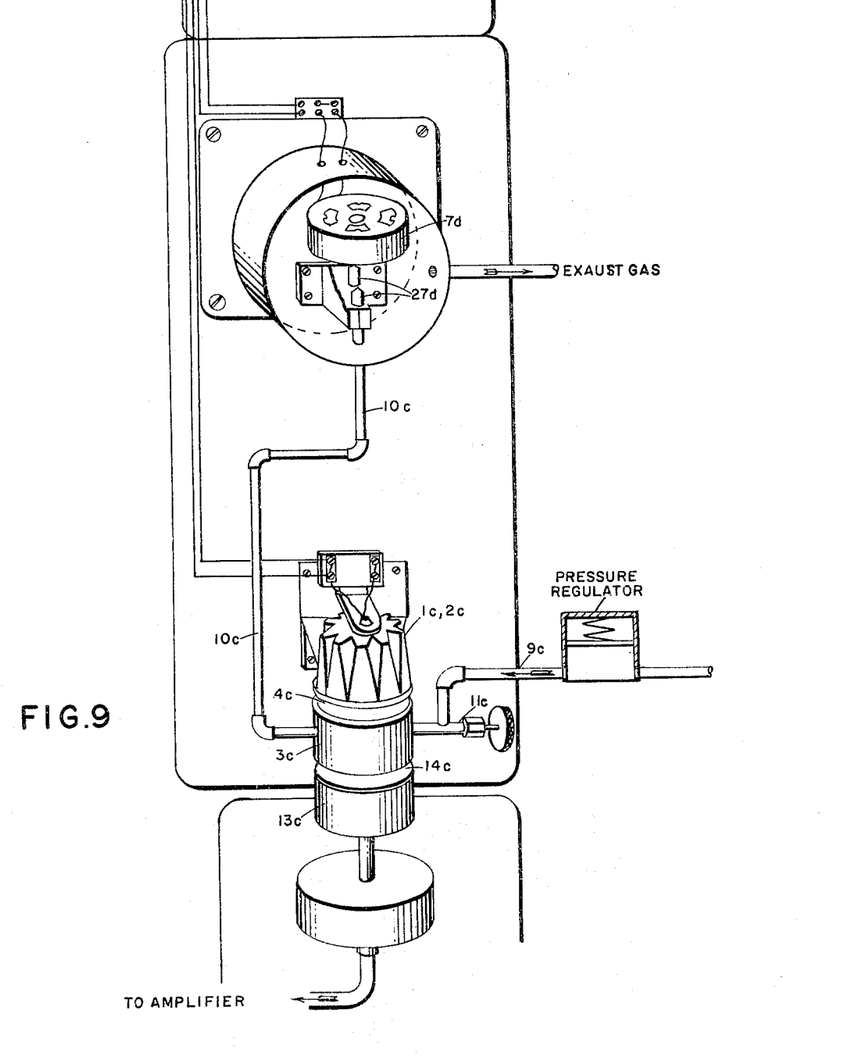
FIG. 9 is a perspective view of a somewhat modified apparatus in accordance with FIG. 5.

FIG. 9 is a perspective view of the instrument shown schematically in FIG. 5. As pressure modulating device, there is used an arrangement in accordance with FIG. 7. The individual structural parts are marked in accordance with the numbers of the structural parts of FIGS. 5 and 7. The manner of operation is the same as that of the instrument shown in FIG. 5.

Figure 10:
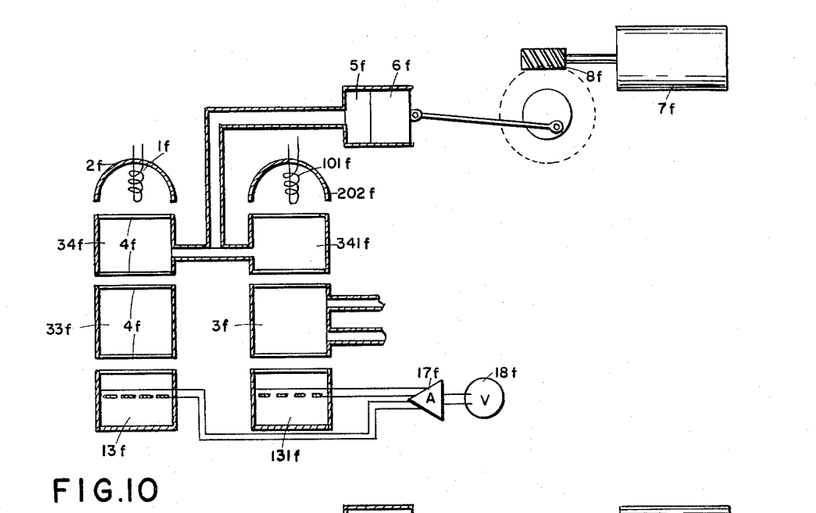
FIG. 10 is a schematic section through an apparatus having two ray paths and common modulation device, as well as selective receivers.

FIG. 10 is a schematic cross-section through an instrument having two ray paths. There are provided two radiation sources 1f and 101f, as well as two reflector mirrors 2f and 202f, there being provided opposite each of the radiators a receiver 13f and 131f respectively. The manner of operation of the receivers 13f and 131f corresponds to the manner of operation of part 13 in FIG. 1. Between each radiator 1f and 101f and the corresponding receiver 13f and 131f respectively, there is provided a modulation cell 34f and 341f respectively. The modulation cells are connected with each other by a gas line. The two cells 34f and 341f are connected via another gas line with a cylinder 5f in which a piston 6f slides up and down in a gas-tight manner. The piston is placed in oscillation by the synchronous motor 7f via a gearing 8f. The cells 34f and 341f are filled with the gas component in the presence of which is to be determined in the analysis gas. By the oscillations of the piston 6f in the cylinder 5f, the pressure and the density of the filling gas present in the cells 34f and 341f changes and in this way the radiation absorption in the spectral region characteristic of the component to be analyzed also changes. The radiation of the radiators 1f and 101f is absorbed periodically alternately more strongly and more weakly in the spectral region characteristic of the component to be analyzed and therefore in its amplitude. In the ray path of the left-hand radiator 1f there is provided, behind the modulation cell 34f, a cell 33f filled with comparison gas while in the ray path of the right-hand radiator 101f there is arranged at the corresponding point a cell 3f which is filled with the gas to be analyzed. If the measurement gas in cell 3f does not contain the component with which the receivers 13f and 131f respectively and the modulation cells 34f and 341f are filled the modulation of the rays from the radiation sources 1f and 101f respectively takes place symmetrically in the two ray paths. The receivers 13f and 131f give similar signals to the amplifier 17f. Since the two receivers are connected in opposition, the resultant periodic output signal is equal to zero. If the measurement gas in a cell 3f however contains the component to be analyzed, with which component the modulation cells 34f and 341f are filled, then the two modulated rays which fall upon the receivers 13f and 131f show differences in the amplitude and phase of modulation. These differences are amplified by the amplifier 17f and fed to the indicating instrument 18f; the output sign of amplifier 17f is a measure of the content of the component to be analyzed in the measurement gas in cell 3f.

Figure 11:
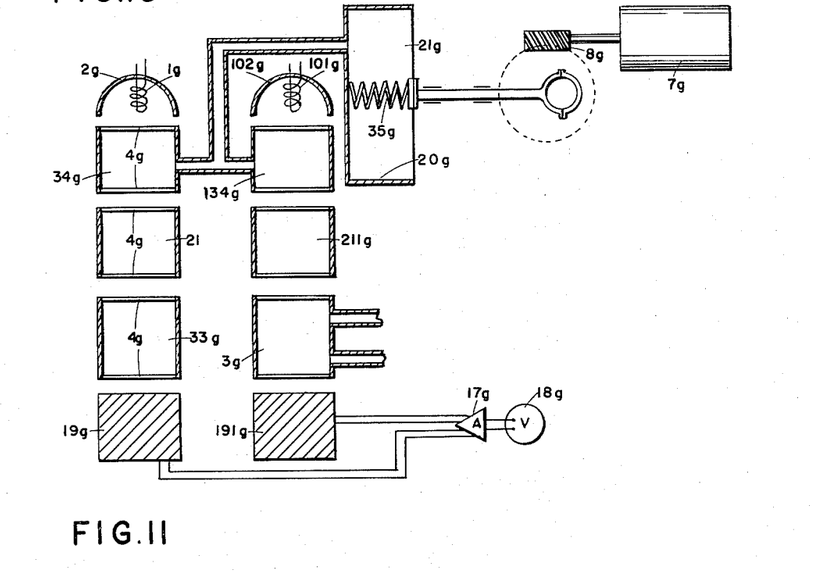
FIG. 11 shows a similar apparatus having a somewhat modified modulation device and non-selective receiver as well as filter cells connected in the ray path.

The arrangement shown in the schematic cross-section of FIG. 11 is similar in its manner of operation to the arrangement in accordance with FIG. 10. In this case also there are provided two radiators having two reflectors 1g and 101g and 2g and 202g respectively. In each ray path there is provided a modulation cell 34g and 341g respectively, which cells are connected with each other and furthermore, via a transverse connection, with a modulation device 20g. The latter consists of a housing which is closed off by a diaphragm 21g. The diaphragm 21g in its turn is placed in oscillation by a synchronous motor 7g, a cam drive 8g and an opposing spring 35g, whereby the gas present in the chambers 34g and 341g is subjected to pressure and density variations. The chambers 34g and 341g are in their turn filled with that gas component, the content of which in the measurement gas is to be determined. In one of the two ray paths, there is again arranged a cell 3g filled with the measurement gas or through which the measurement gas flows, while in the other ray path there is arranged a corresponding cell 33g which is filled with a comparison gas. In each of the two ray paths, there is also provided a filter cell 21g and 211g respectively filled with a disturbing gas. As a result of this, those rays of the radiation sources 1g and 101g which would interfere with the measurement are intercepted. The receivers 19g and 191g are developed as non-selective receivers (bolometers, thermocouples, photoelectric cells, etc.). They are again connected in opposition. The resultant modulated output signal is amplified by amplifier 17g and fed to the measurement instrument 18g. The measurement cells are again, as in all the instruments described, tightly closed on top and on bottom by windows 4g which are permeable to the infrared radiation.

Figures 12, 12A:
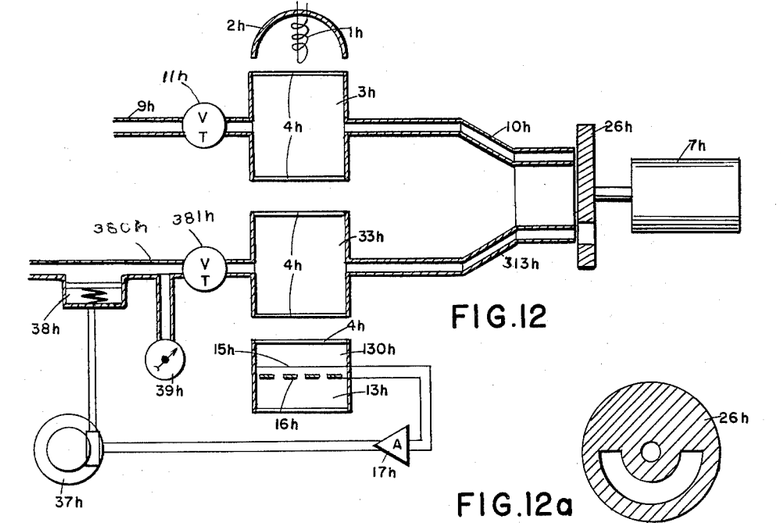
FIG. 12 is a section through an apparatus having a single ray path, selective receiver, push-pull modulation and compensation of the measurement value in the comparison cell.
FIG. 12a is a detail of the apparatus of FIG. 12.

FIG. 12 shows an instrument in which the measured value is compensated by a corresponding change of the physical state of the comparison gas. The radiation proceeding from the radiator 1h is focused by the concave reflector 2h and directed against the selective pneumatic receiver 13h. This receiver contains the same structural parts and has the same manner of operation as receiver 13 in FIG. 1. Between the radiation source 1h and the receiver 13h, there are arranged two cells 3h and 33h having transparent ends 4h. The gas to be measured is forced into the measurement chamber 3h through the conduit 9h. The conduit 9h is connected, as in the examples in accordance with FIGS. 1 to 8, to a device for the removal of the measurement gas which supplies the measurement gas under a constant pressure. An adjustable throttle valve 11h is provided in conduit 9h. The analysis gas leaves the measurement chamber 3h through a conduit 10h. Comparison gas flows, via conduit 380h, over the control valve 38h and the throttle valve 381h into the comparison chamber 33h. This gas also is taken from the device for the maintaining of a constant pressure. It leaves said chamber through conduit 313h. In front of the ends of the two conduits 10h and 313h, there is arranged the disk-shaped plate 26h which is placed in rapidly rotating motion by a synchronous motor 7h. By means of this plate the ends of the pipe 10h and 331h are alternately exposed and practically closed. The ends of the pipe 10h and 313h are so arranged in front of the disk 26h that in each case one of the two pipe ends is practically blocked by the plate 26h and the other exposed and vice versa. In this way pressure variations which are in phase opposition are produced in chamber 3h and 33h. In a comparison gas which flows through chamber 33h there is contained a given constant quantity of the component to be analyzed, with which the part 130h of the receiver 13h located between the window 14h and the diaphragm of the receiver is also filled. The output of the receiver 13h is connected with the amplifier 17h, the output of which is connected to a servomotor 37h which in its turn effects the displacement of the pressure reducing valve 38h. If the attenuation of the ray from the radiator 1h to the receiver 13h by the gases in chambers 3h and 33h is the same, the counter-phase modulations by the pressure variations counteract each other and the diaphragm capacitor 13h does not give any periodic output signal in the modulation frequency. If for instance the amount of the component which is to be determined in the measurement gas is greater than its content in the comparison gas, the two counter-phase modulations by the measurement gas in chamber 3h and the comparison gas in chamber 33h are no longer equal to one another. There thus results an overall modulation of the ray in synchronism with the frequency of rotation of the disk 26h. The diaphragm capacitor 13h supplies an electric measurement value to the amplifier 17h. The measurement signal is amplified by the amplifier and fed to the servomotor 37h. The servomotor 37h displaces the valve 38h. As a result of this the pressure in the capacitor chamber 33h changes. Since the concentration of the component of interest in the comparison gas is known, the pressure in the comparison chamber 33h is a direct measure of the amount of the component of interest which is present in the measurement gas. The pressure in front of the comparison chamber 33h is indicated by the pressure gauge 39h. If the component of interest for the measurement is not present in the analysis gas, the automatic compensating device sets the pressure in the comparison chamber to atmospheric pressure. Thereupon the part of the radiation characteristic of the component of interest is not modulated, neither in the measurement chamber 3h nor in the comparison chamber 33h; it is not modulated in the measurement chamber 3h since there is no gas which absorbs within this region present and it is not modulated in the comparison chamber because no pressure variations are produced therein. With a constant composition of the comparison gas, the pressure measuring instrument 39h can be calibrated in percentages and then directly gives the content of the component to be measured contained in the measurement gas.

Figure 13:
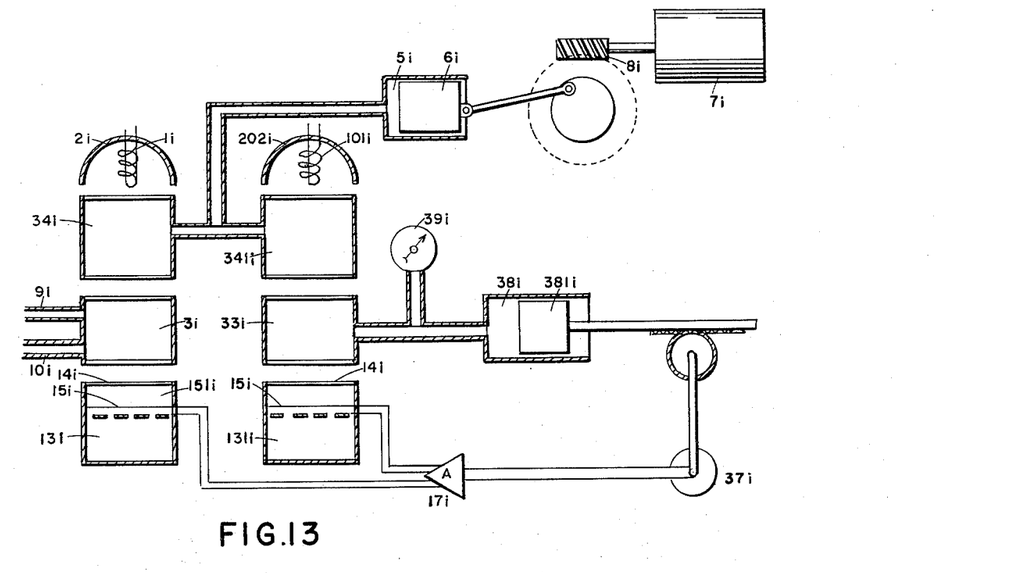
FIG. 13 is a section through an apparatus having two ray paths and compensation in the comparison ray path.

The arrangement shown schematically in cross-section in FIG. 13 also operates in accordance with such a compensation method. Here again there are provided two sources of radiation 1i and 101i and two reflectors 2i and 202i, as well as two selective pneumatic receivers 13i and 131i. In each ray path there is provided a modulation cell 34i or 341i respectively, these cells being connected with each other and also, via a transverse connection, with the cylinder 5i. In the cylinder 5i there oscillates a piston 6i, which is actuated by the gearing 8i by the synchronous motor 7i. The pressure variations in the cylinder 5i are imparted to the gas in the modulation cells 34i and 341i. The modulation cells 34i and 341i are again filled with the gas, the concentration of which in the measurement gas is to be determined, in the same way as in the examples of FIGS. 9 and 10. The radiation from the radiators 1i and 101i is again periodically modulated by the modulation cells 34i and 341i in that radiation range in which the gas component to be measured absorbs. The receivers 13i and 131i are again filled in their upper part 151i between the window 14i and the diaphragm 15i with the gas the presence of which in the measuring gas is to be indicated. In the ray path of the one radiator 1i, there is again provided a cell 3i into which the gas to be measured flows through a pipe 9i and from which it discharges again to the pipe 10i. In the second ray path of the radiator 101i on the other hand, there is arranged a cell 33i filled with a comparison gas, which cell corresponds to cell 3i as in the preceding examples. This cell is connected via a pipe with a vessel the volume of which can be increased and reduced. In the figure, this vessel 38i is shown schematically as a cylinder having a movable piston 381i. In practice there will be used for this purpose a vessel of variable volume from which no gas can escape, such as for instance bubbles or diaphragm chambers. The piston 381i is displaced by a servomotor 37i which receives its operating current from the amplifier 17i. The diaphragm capacitors of the receiver chambers 13i and 131i are connected to the amplifier 17i. The manner of operation of this arrangement corresponds to the manner of operation of the arrangement of FIG. 12. If the same number of molecules of the gas to be determined are present in the measurement cell 3i and in the comparison cell 33i, the attenuation of the portion of the rays from the modulation sources $1i$ and $101i$ which is modulated by the chambers $34i$ and $341i$ is in both cases the same, the output values of the capacitor pressure gauges $13i$ and $131i$ are equal to each other, the amplifier $17i$ does not supply any output current and the servomotor $37i$ is stationary. If the amount of the absorbing component of interest contained in the measurement gas is too great, the output of the two pneumatic receivers $13i$ and $131i$ is asymmetric and the amplifier $17i$ supplies a periodically modulated output voltage of given phase to the servomotor $37i$. The servomotor is placed in motion and reduces the volume in the cylinder of the vessel $38i$ until the same number of molecules absorbing in the spectral range of interest is contained in both chambers $3i$ and $33i$. Since the amount of the component of interest in the comparison gas in cell $33i$ and in vessel $38i$ is known, the pressure in these vessels again constitutes a measure for the amount of the component of interest present in the measurement gas. Via the receivers $13i$ and $131i$, the amplifier $17i$ and the servomotor $37i$ and the variable pressure vessel $38i$, there is produced in each case in cell $33i$ a pressure at which the same number of molecules of the gas component of interest is present in the two cells $3i$ and $33i$. This instrument is particularly suitable for the measurement of gas concentrations with suppressed initial range.

The two arrangements in accordance with FIGS. 12 and 13 can be used directly without the servomotors $37h$ and $37i$, as well as the pressure reducing valve $38h$ or the pressure vessel $38i$ respectively as instruments with suppressed zero point and the output voltage of the amplifier then is a measure of the deviation of the concentration of the component of interest contained in the measurement gas from the concentration of this same component in the comparison gas and is indicated by an indicating instrument in a manner similar to the previous examples.

Figure 14:
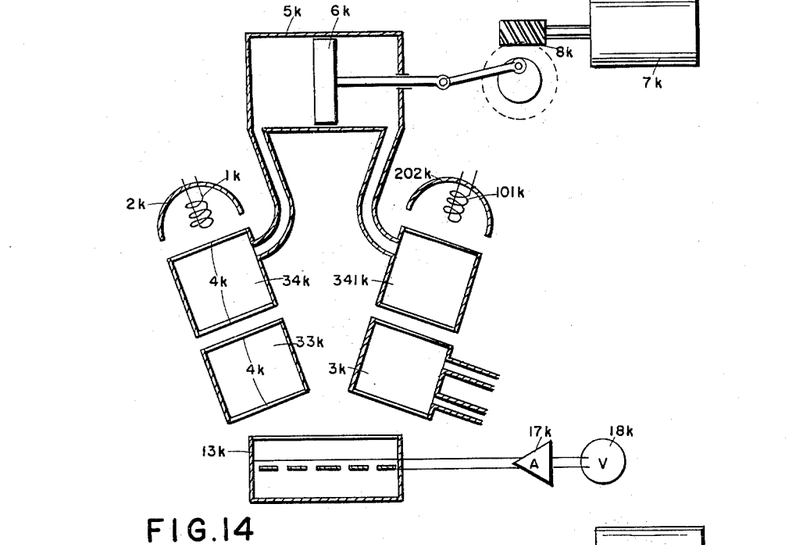
FIG. 14 shows an apparatus having two ray paths, push-pull modulation and a single receiver.

FIG. 14 shows an arrangement in which the radiation of the two radiators $1k$ and $101k$ respectively is directed by the reflector mirrors $2k$ and $202k$ onto one and the same selective receiver $13k$. For this purpose, it is necessary to modulate the two rays in phase opposition. In both ray paths, there is again arranged a modulation cell $34k$ and $341k$ respectively, which cells are filled with the gas the content of which in the measurement gas is to be determined. The two modulation chambers $34k$ and $341k$ are each connected with one end of a cylinder $5k$ which is closed at both ends and in which a piston $6k$ moves. This piston is actuated by a rod sealed by a stuffing box and gearing $8k$ from a synchronous motor $7k$. As a result of this arrangement the pressure in the left-hand chamber increases and the pressure in the right-hand chamber decreases and vice versa. The modulation of the ray components of interest therefore takes place in phase opposition in the two rays. In one of the two ray paths, there is again provided a measurement chamber $3k$ through which the measurement gas flows, while in the other a comparison chamber $33k$ is provided. If the component of interest is not present in the measurement gas, the receiver $13k$ does not give at its output an alternating current of the frequency of the oscillation of the piston $6k$. The measuring instrument $18k$ connected to the output of the amplifier $17k$ indicates zero. If the measurement gas in chamber $3k$ contains the component of interest, the attentuation of the ray on the right-hand side of FIG. 14 is greater than that of the ray on the left-hand side, the modulation of the two ray paths becomes unequal and the output value of the diaphragm capacitor $13k$ appears in the frequency of the motion of the piston $6k$ modulated with a given phase. The strength of the modulated output signal serves as a measure of the amount of the component of interest present in the measurement gas and is indicated on the instrument $18k$.

Figure 15:
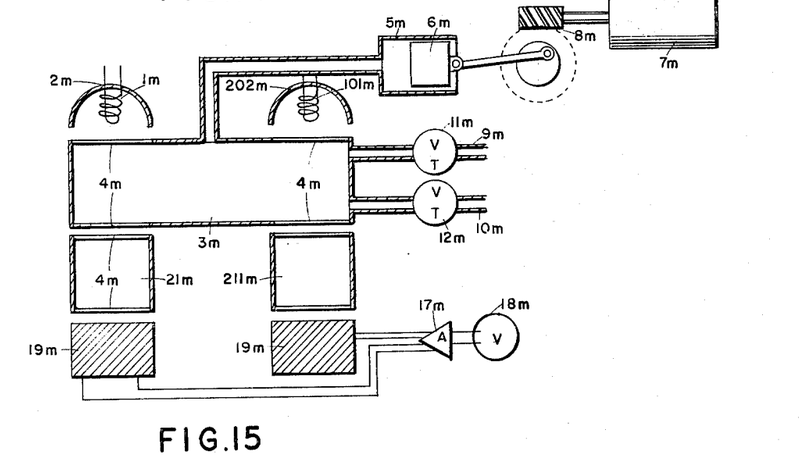
FIG. 15 is a section through an apparatus which operates in accordance with the negative filter method.

FIG. 15 shows an instrument which operates in accordance with the negative filter method with two ray paths. Once again two sources of radiation $1m$ and $101m$ and two concave reflectors $2m$ and $202m$ are provided. In the two radiation sources there lies a cell $3m$ which is traversed by the measurement gas via the conduits $9m$ and $10m$, and the throttle valves $11m$ and $12m$. In the two radiation sources there is furthermore provided a cell $21m$ and $211m$ respectively. One of the two cells ($21m$) is filled with the gas, the concentration of which in the analysis gas is to be measured, while the other cell $211m$ contains a comparison gas. The two receivers $19m$ are developed as non-selective receivers, the otputs of which act on the amplifier $17m$ which amplifies the output signals which are connected in opposition to each other and feeds them to the indicating instrument $18m$. To the cell $3m$ there is once again connected a cylinder $5m$ in which a piston $6m$ moves. The piston is driven via the gearing $8m$ by the synchronous motor $7m$. As a result of this the density of the measurement gas in cell $3m$ is periodically varied, and the radiation is periodically modulated in the characteristic absorption range of the measurement gas. The radiation is practically entirely absorbed by the gas in the cell $21m$ which contains the gas component to be measured in the absorption range characteristic for the gas component to be measured. If the component of interest is also present in the measurement gas in cell $3m$, there is a greater or lesser absorption in both of the ray paths of the corresponding radiation part, and the difference between the modulated radiations striking against the receivers $19m$ and $191m$ therefore depends on the content of the component to be measured in the measurement gas and is indicated via the amplifier $17m$ by the indicating instrument $18m$.

Figure 16:
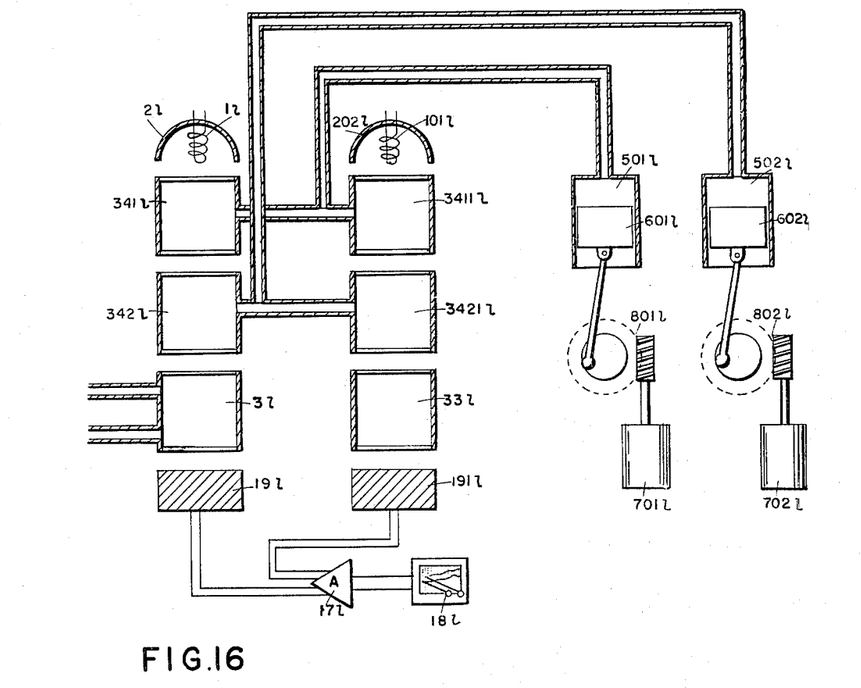
FIG. 16 shows schematically an apparatus for analyzing the measurement gas as to its content of two different components.

In FIG. 16 there is shown an instrument which makes it possible to measure, one after the other, the content of two different components of interest in a measurement gas. There are again provided two ray paths having two radiators $1l$ and $101l$ respectively and two reflectors $2l$ and $201l$ respectively, as well as two receivers $19l$ and $191l$. In each ray path there are located, one behind the other, two modulation cells $341l$ and $3411l$ and $342l$ and $3421l$ respectively, which are connected in pairs with each other by a gas line. Each pair of cells $341l$ and $3411l$ as well as $342l$ and $3421l$ is connected with a cylinder $501l$ or $502l$ respectively in which the pistons $601l$ and $602l$ move. The two pistons are driven via gearings $801l$ and $802l$ by the synchronous motors $701l$ and $702l$. In one of the two ray paths, there is arranged a measurement chamber $3l$, which is traversed by the gas to be measured, while in the second there is arranged a chamber $331$ which contains the comparison gas. The manner of operation corresponds to the embodiment of the invention shown in FIG. 10. The cells $341l$ and $3411l$ and $342l$ and $3421l$ respectively are filled with two different gases the components of which in the measurement gas are to be determined. In each case only one of the two synchronous motors $701l$ or $702l$ is placed in operation so that the two infrared rays proceeding from the radiation sources $1l$ and $101l$ are modulated in each case in a spectral region which corresponds to the characteristic spectral region of one of the two gas components which are to be determined. The output signal of the two receivers $19l$ and $191l$, amplified by the amplifier $17l$, then corresponds to the content in the measurement gas of the component which is contained in that cell $341l$ and $3411l$ respectively, or $342l$ or $3421l$ respectively, the modulating device of which $501l$ and $502l$ respectively is just in operation. By means of a multiple recording instrument, the corresponding measurement value is recorded and thereupon the one synchronous motor is stopped and the other one of the two synchronous motors is placed in motion. The output signal of the two receivers is now proportional to the amount of the second desired component in the measurement gas. It is also recorded on the recording instrument 18*l*, whereupon the cycle can be repeated.

Figure 17:
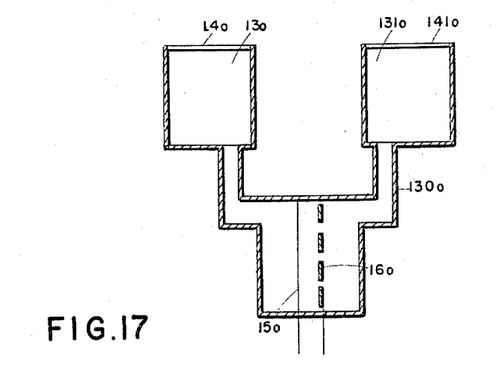
FIG. 17 is a section through a pneumatic selective receiver, such as can be used optionally instead of the receiver in FIGS. 10 and 11, as well as FIGS. 13, 15 and 16.

FIG. 17 shows furthermore a selective radiation receiver such as can be used if desired in the instrument in accordance with FIGS. 9 and 13. The two chambers 13*o* and 131*o* are closed on top by a window 14*o* and 141*o* which are permeable to radiation. They are filled with the gas, the amount of which in the analysis gas is to be determined. The chambers 13*o* and 131*o* are connected with another chamber 130*o* by gas feed lines. The chamber 130*o* is divided into two halves by a metal diaphragm 15*o*. Opposite the diaphragm 15 and insulated from it there is a perforated metal electrode 16*o*. The manner of operation of the arrangement corresponds in principle to the selective receivers 13 in FIGS. 1, 4, 5 etc. Different radiation of the gas charge in the chambers 13*o* and 131*o* effects a different amount of heating and a different pressure. The pressure difference in the two chambers causes a change in the capacitance of the diaphragm capacitor 15*o* and 16*o* which is indicated by an electric measuring instrument with the interposition of an amplifier 17.

The apparatus in accordance with the invention can advantageously be employed for the analysis of gas, vapor and gas-vapor mixtures. The following examples are given in order to explain the manner of operation of the proposal in accordance with the invention.

For the measurement of $CO_2$ in air, measurement range 0–3% by volume, there is used a single beam instrument in accordance with FIG. 4. The gas to be analyzed is conducted, with a constant initial preliminary pressure of 500 mm. water column, by a bubbling pressure controller or a diaphragm pressure controller, to a rotating gas switch which has a frequency of rotation of 6 revolutions per second. One outlet of the gas switch is connected with the outer air and one outlet is connected with the measurement cell. As measurement cell there is used a metal cell of a length of 5 mm. and an inner diameter of 22 mm. closed with rock-salt windows; it also has a second connection which extends into the open via a throttle. The present example is characterized by the fact that in the mixture of materials to be analyzed, only the gas which is to be detected, namely, $CO_2$, has any effective radiation absorption. In these and all similar cases, a non-selective receiver can be used. This makes it possible in general to simplify the detection device.

In order to check a mixture of nitrogen-hydrogen for traces of CO (measurement range 0–0.1% by volume), the single beam instrument in acordance with the invention can also be successfully employed. With the proposal in accordance with the invention, the setting of such a small measurement range with great accuracy of indication in the vicinity of the zero point and a constancy for weeks of the zero point are assured; this is not possible with the previously known devices. In the example indicated above, while it is possible to employ a non-selective receiver, it is advisable however, in order to avoid the influence of disturbing gas, which must be expected in the present trace measurements, to employ a selective receiver.

When analyzing gaseous hydrocarbons, one component frequently disturbs the measurement of another, by band overlapping. An example is the measurement of ethylene in the presence of propylene. To be sure this disturbing influence can at times be reduced by interposing a cell which contains the disturbing gas, but this measure does not lead to the desired goal in unfavorable cases such as the present one. For instance the disturbing influence of propylene in a known infra-red gas analyzer is 0.84, i.e., 1% propylene gave the same indication as 0.84 ethylene. This disturbing influence can be reduced to 0.45 by filtering. A device in accordance with the invention, even without filtering, gives a disturbing influence of 0.4 and with additional filtering a disturbing influence of 0.2. This increase in the selectivity makes it possible to employ the instrument to particular advantage for practical operational control. In an apparatus having modulation cells in accordance with the invention, the selectivity can be increased further by using a selective receiver or by installing a filter cell which contains the disturbing gas or else by using both a selective receiver and a filter cell. Which of these measures is best depends on the particular composition of the mixture of substances to be analyzed and on the band overlapping of the individual components. In general the last of said three combinations will give greatest assurance of success in the case of difficult measurement problems. However, the use of filter cells will frequently also be advisable in the case of single beam instruments with modulated measurement cell.

It is frequently necessary to detect different substances at different times with one and the same instrument. This can be effected in a simple manner in a double beam instrument provided with modulation cells and non-selective receivers. As example there may be mentioned the measurement of carbon monoxide and carbon dioxide. The modulation cell is connected by a mannually actuated gas switch to a $CO_2$ cylinder and to a CO cylinder and can be filled as desired with one or the other of these gases. Depending on the selected position of the gas switch, on the one hand the CO content and on the other hand the $CO_2$ content is measured. The switching can also be made automatic by means of a motor driven gas switch in combination with a synchronously controlled multiple recorder, but it is simpler here to use two pairs of modulation cells filled with different gases and which are arranged one after the other in the ray path, modulated one after the other.

It has been found that at times better selectivity can be obtained by using the negative filter method in combination with a modulated measurement cell. Thus for instance for the measurement of ethylene in a variable methane-nitrogen mixture, there can be employed, instead of a large cell, a modulated double measurement cell which is passed through by both ray paths of a two beam instrument. In the one ray path there is interposed a cell filled with ethylene and in the other a similar cell filled with $N_2$.

The apparatus in accordance with the invention can also be used for the analysis of liquids and solids. For instance the water content of organic solvents, for instance carbon tetrachloride, can be measured. As filling gas for the modulation cell there may be used in this connection either nitrogen having a fixed water vapor partial pressure or ammonia. The use of ammonia gas makes the arrangement less selective, it is true, but on the other hand it has the advantage of greater sensitivity. A measurement range of 0–0.1 percent by weight water can be obtained wtihout difficulty. An example of the analysis of solids is the determination of the water content in foils, for instance in cellophane.

The invention claimed is:

1. Instrument for the analysis of gases and vapors with a source of radiation, a concave reflector for focusing the radiation, a radiation receiver, a cell which is filled with the analysis gas, means for producing periodic pressure variations in the measurement cell, the radiation receiver consisting of a closed vessel filled with the gas components to be determined in the measurement gas, which vessel is closed by a ray-permeable window on the side facing the radiation source and by a diaphragm on the other side, as well as means for electrically indicating the position of said diaphragm.

2. Instrument for the analysis of gases and vapors, having a source of radiation and a concave reflector for focusing the radiation proceeding from the source of radiation, as well as a radiation receiver having a filter cell arranged in the ray path and filled with disturbing gases and a measurement cell also arranged in the ray path, a gas conduit for feeding the measurement gas under pressure to the measurement cell, a throttle valve in said conduit, a gas conduit to remove the analysis gas from the measurement cell, and means for the periodic opening and closing of the gas conduit.

3. An instrument according to claim 2, in which the means for the periodic opening and closing of the gas discharge conduit consists of a disk rotating in front of the end of said conduit and provided with recesses, as well as a synchronous motor for the driving of said disk.

4. Instrument for the analysis of gases and vapors having two radiation sources and a radiation receiver, with two modulation cells, each of which is arranged in each ray path and which are filled with a filling gas, as well as means for producing counter-phase pressure variations of the filling gas of the two modulation cells, a cell traversed by the measurement gas in the one ray path and a cell filled with comparison gas in the other ray path, as well as means in combination with the radiation receiver to indicate the modulated radiations, the two modulation chambers being filled with the gas the content of which in the measurement gas is to be determined.

5. A device for analyzing test gas and vapor by infrared absorption comprising, a vessel having inlet and outlet portions for passing the test gas through the vessel, means for periodically varying the pressure on the gas passing through the vessel, said vessel being provided with windows transparent to infra-red radiation; a source of infra-red radiation for directing infra red rays through the vessel, and a radiation detector for detecting the radiation passing through the vessel from the source and which is selectively responsive to changes in the absorption of the radiation by the presence of given gaseous matter which may be in the test gas.

6. In a device as claimed in claim 5, said vessel being interposed directly between the source and the detector.

7. An instrument as claimed in claim 1, said means for producing periodic pressure variations being means for periodically filling of the measurement cell with the analysis gas under pressure and at least partially emptying the cell of analysis gas.

8. An instrument as claimed in claim 1, and a filter between the said source and the cell.

9. An instrument as claimed in claim 5, and a filter between said source and the vessel.

10. An instrument as claimed in claim 5, and a second vessel having inlet and outlet portions optically interposed in line with the first vessel between said source and the detector and adapted to have comparison gas passed therethrough, means for varying the pressure of gas passing the second vessel in counter-phase with pressure variations in the first vessel, and means responsive to the detector to vary the static pressure of one of said gases until modulation of the radiation in the two vessels is the same.

11. An instrument as claimed in claim 10 said means to vary the static pressure being for varying the static pressure of the comparison gas.

12. An instrument as claimed in claim 5, and a second source of infra red light directed through the vessel at a different location from that of the first mentioned source; a second detector for light directed by the second source; filter means containing the gas to be analysed for interposed in the beam of one source and filter means containing a comparison gas interposed in the beam of the other source, said detectors being connected in opposition.

References Cited in the file of this patent

UNITED STATES PATENTS

| | | |
|---|---|---|
| 2,758,216 | Luft | Aug. 7, 1956 |
| 2,806,957 | McDonald | Sept. 17, 1957 |
| 2,875,340 | Liston | Feb. 24, 1959 |

FOREIGN PATENTS

| | | |
|---|---|---|
| 329,111 | Great Britain | May 15, 1930 |
| 703,495 | Great Britain | Feb. 3, 1954 |
| 749,689 | Great Britain | May 30, 1956 |